(12) United States Patent
Hayashi

(10) Patent No.: US 12,125,291 B2
(45) Date of Patent: Oct. 22, 2024

(54) IMAGE PROCESSING APPARATUS

(71) Applicant: DENSO CORPORATION, Kariya (JP)

(72) Inventor: Hiroki Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 398 days.

(21) Appl. No.: 17/547,488

(22) Filed: Dec. 10, 2021

(65) Prior Publication Data

US 2022/0101636 A1    Mar. 31, 2022

Related U.S. Application Data

(63) Continuation of application No. PCT/JP2020/021151, filed on May 28, 2020.

(30) Foreign Application Priority Data

Jun. 13, 2019 (JP) .................................. 2019-110335

(51) Int. Cl.
| | | |
|---|---|---|
| *G06K 9/00* | (2022.01) | |
| *G06N 3/08* | (2023.01) | |
| *G06T 7/00* | (2017.01) | |
| *G06V 20/58* | (2022.01) | |

(52) U.S. Cl.
CPC .............. *G06V 20/58* (2022.01); *G06N 3/08* (2013.01); *G06T 7/0002* (2013.01); *G06T 2207/20081* (2013.01); *G06T 2207/20084* (2013.01)

(58) Field of Classification Search
CPC ........ G06V 20/58; G06V 20/59; G06V 10/82; G06V 10/776; G06N 3/08; G06N 3/045; G06T 7/0002; G06T 2207/20081; G06T 2207/20084; G06T 1/20; G06F 11/277
See application file for complete search history.

(56) References Cited

U.S. PATENT DOCUMENTS

| | | |
|---|---|---|
| 5,778,008 A | 7/1998 | Shimizu et al. |
| 2006/0208169 A1* | 9/2006 | Breed ................. G01S 17/88 |
| | | 250/221 |
| 2016/0117831 A1 | 4/2016 | Nakashima et al. |
| 2018/0082138 A1 | 3/2018 | Ito |

FOREIGN PATENT DOCUMENTS

| | | | | |
|---|---|---|---|---|
| CN | 108875505 A | * | 11/2018 | ......... G06K 9/00362 |
| EP | 2916293 A2 | * | 9/2015 | ............... B60R 1/00 |
| JP | H09-006943 A | | 1/1997 | |
| JP | 2005-115566 A | | 4/2005 | |
| JP | 2016-085721 A | | 5/2016 | |
| JP | 2018-045560 A | | 3/2018 | |

* cited by examiner

*Primary Examiner* — Xin Jia
(74) *Attorney, Agent, or Firm* — Harness, Dickey & Pierce, P.L.C.

(57) ABSTRACT

An image processing apparatus includes a photographing device, an image processor and a fault diagnostic device. The photographing device outputs image data. The image processor includes an electronic circuit having recognition algorithms respectively for image recognition of a predetermined recognition target included in the image data. The fault diagnostic device determines that a fault occurs in the image processor, based on a condition that a first recognition result of recognizing test image data including a characteristic pattern also included in the recognition target in case of the image processor receiving the test image data is different from an expected value as a second recognition result of recognizing the test image data in case of one of the recognition algorithms receiving the test image data.

10 Claims, 5 Drawing Sheets

IMAGE PROCESSING APPARATUS

CROSS REFERENCE TO RELATED APPLICATIONS

The present application is a continuation application of International Patent Application No, PCT/JP2020/021151 filed on May 28, 2020, which designated the U.S, and claims the benefit of priority from Japanese Patent Application No. 2019-110335 filed on Jun. 13, 2019. The entire disclosures of all of the above applications are incorporated herein by reference.

TECHNICAL FIELD

The present disclosure relates to an image processing apparatus.

BACKGROUND

An image processing apparatus may include an image processor having an electronic circuit with a recognition algorithm. Although the image processor executes image processing, the image processor may not correctly execute the image processing based on the recognition algorithm in a situation where the electronic circuit in the image processor has a fault.

SUMMARY

The present disclosure describes an image processing apparatus that includes a photographing device, an image processor and a diagnostic device.

BRIEF DESCRIPTION OF DRAWINGS

Objects, features and advantages of the present disclosure will become more apparent from the following detailed description made with reference to the accompanying drawings. In the drawings.

DETAILED DESCRIPTION

In a comparative example, a recognition algorithm in an electronic circuit of an image processor receives a test image corresponding to the recognition algorithm in a time-division manner, and a fault in the electronic circuit is identified by comparing an image processing result as the recognition result with an original expected value.

However, the image processor in the comparative example executes the image recognition in a time-division manner through multiple recognition algorithms. In a situation of diagnosing a fault, it is necessary to modify the test image according to the corresponding recognition algorithm whenever the image recognition is executed in a time-division manner according to the correspondingly one of the recognition algorithms. As the time required for the fault diagnosis takes longer, the usage efficiency of the image processor may decrease.

According to an aspect of the present disclosure, an image processing apparatus includes a photographing device, an image processor and a fault diagnostic device. The photographing device outputs image data. The image processor includes an electronic circuit having recognition algorithms respectively for image recognition of a predetermined recognition target included in the image data. The fault diagnostic device determines that a fault occurs in the image processor, based on a condition that a first recognition result of recognizing test image data including a characteristic pattern also included in the recognition target in case of the image processor receiving the test image data is different from an expected value as a second recognition result of recognizing the test image data in case of one of the recognition algorithms receiving the test image data.

Therefore, it is possible to enhance the usage efficiency of the image processor since it is possible to diagnose multiple recognition algorithms simultaneously.

The following describes an embodiment with reference to drawings.

Figure 1:
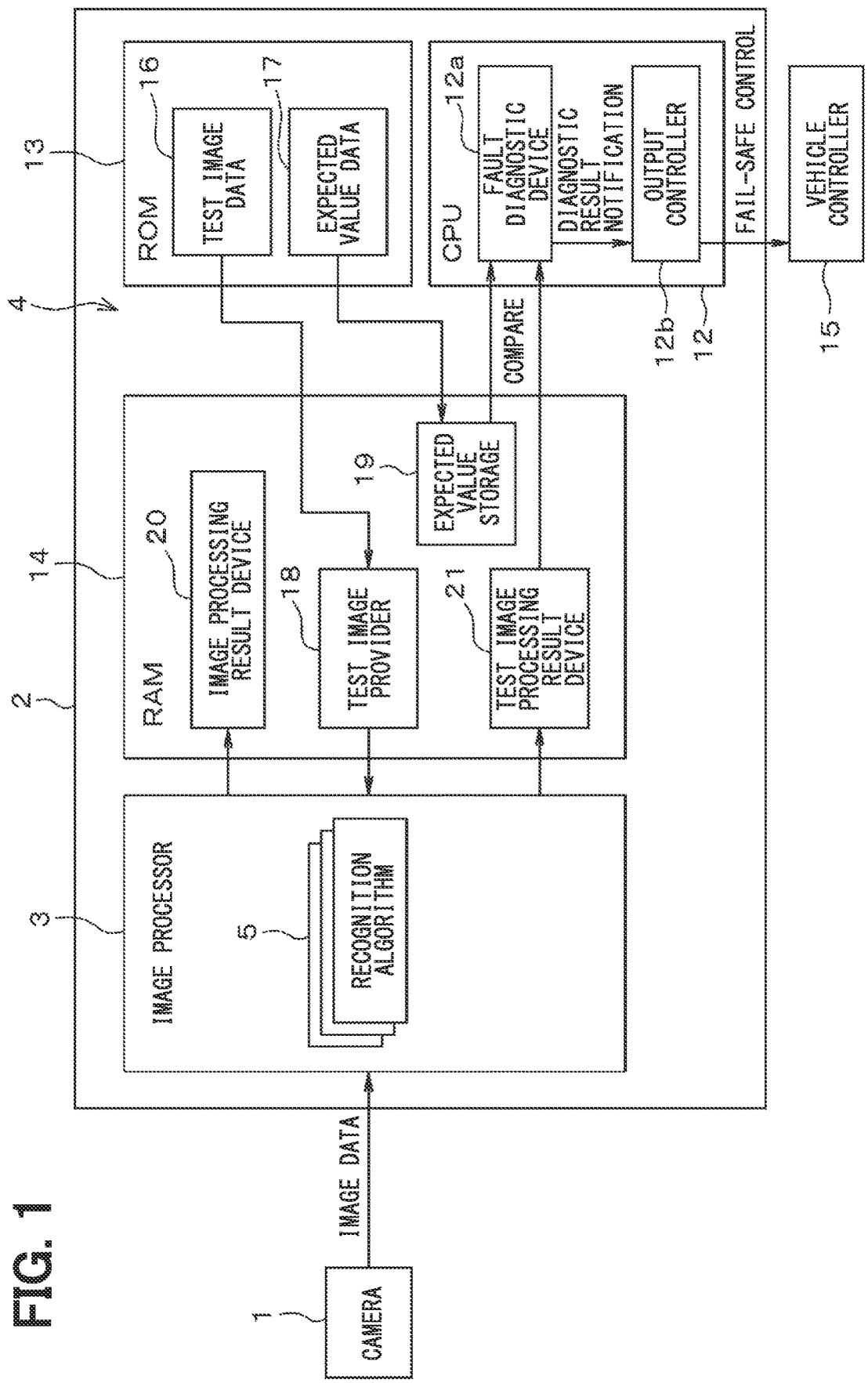
FIG. 1 is a functional block diagram that illustrates an entire configuration of an image processing apparatus according to an embodiment.

A camera 1 illustrated in FIG. 1 is disposed at a front glass of a vehicle (not shown), and the camera 1 takes a shot of the front side of a vehicle. The camera 1 may also be referred to as a photographing device. The camera 1 takes a shot of the front side of the vehicle, and outputs an image data to an image processing apparatus 2.

The image processing apparatus 2 executes image processing for recognizing whether or not a predetermined recognition target is included in the image data received from the camera 1. The image processing apparatus 2 includes an image processor 3 and a microcomputer 4.

The image processor 3 includes a semiconductor integrated circuit. The image processor 3 has multiple recognition algorithms for image recognition to recognize whether or not the predetermined recognition target is included in the image data received from the camera 1. The image recognition is executed at the same cycle as the frame rate of the image data from the camera 1.

The recognition algorithm is formed by a neural network 5, and is designed so that the recognition accuracy of the characteristic pattern included in the predetermined recognition target enhances. In other words, the detected targets include, for example, a vehicle, a person and a road sign located in front of the vehicle. Therefore, the recognition algorithm is designed to recognize the characteristic pattern included in the detected targets.

The following describes the neural network 5.

Figure 2:
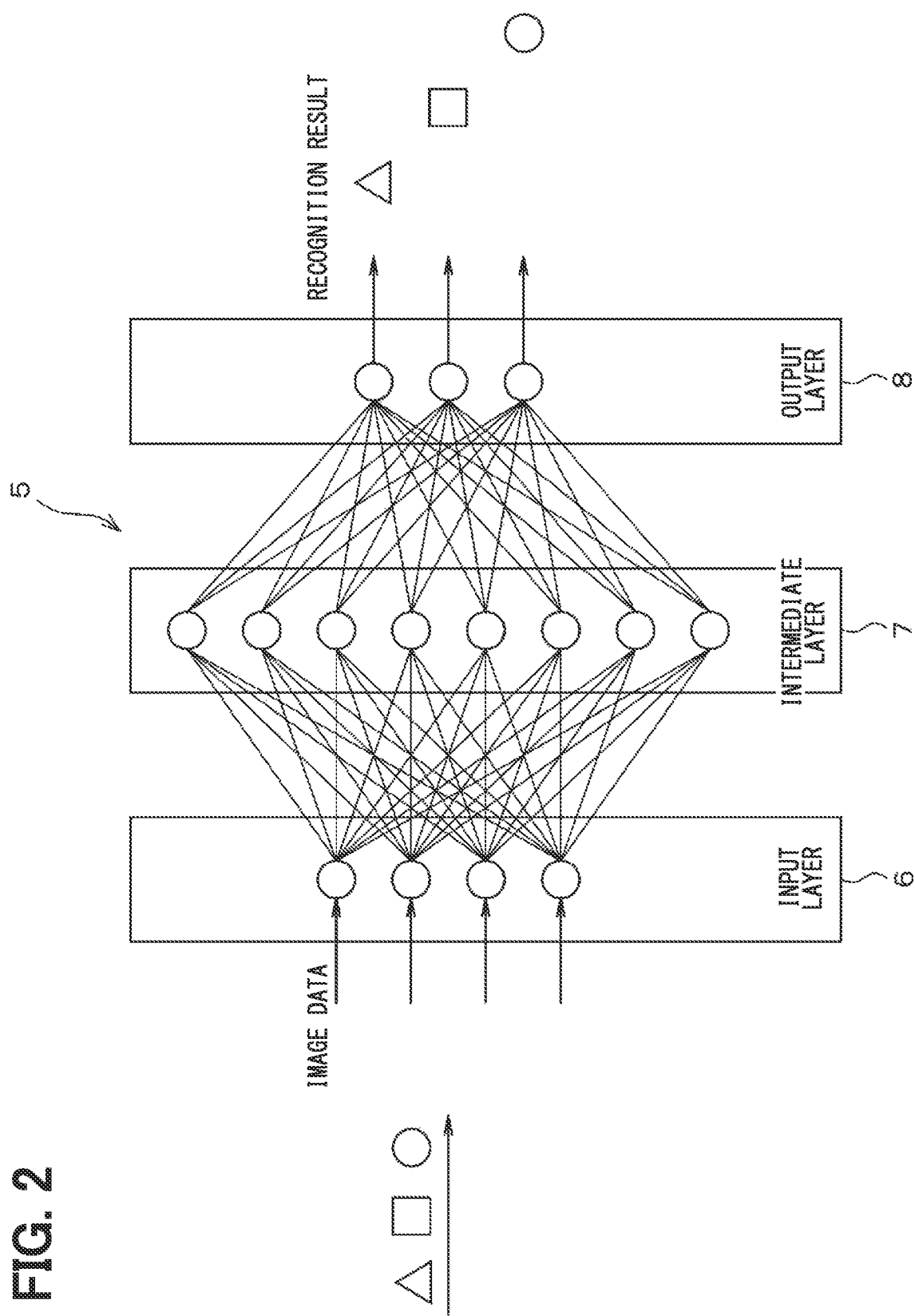
FIG. 2 illustrates a neural network.

As illustrated in FIG. 2, the neural network 5 can process image recognition by multiple recognition algorithms in parallel, and includes an input layer 6, an intermediate layer 7 and an output layer 8. The input layer 6 receives the image data from the camera 1. The intermediate layer 7 has a combination of a convolutional layer and a pooling layer. The output layer 8 outputs the recognition accuracy of the recognition target as the recognition result.

Figure 4:
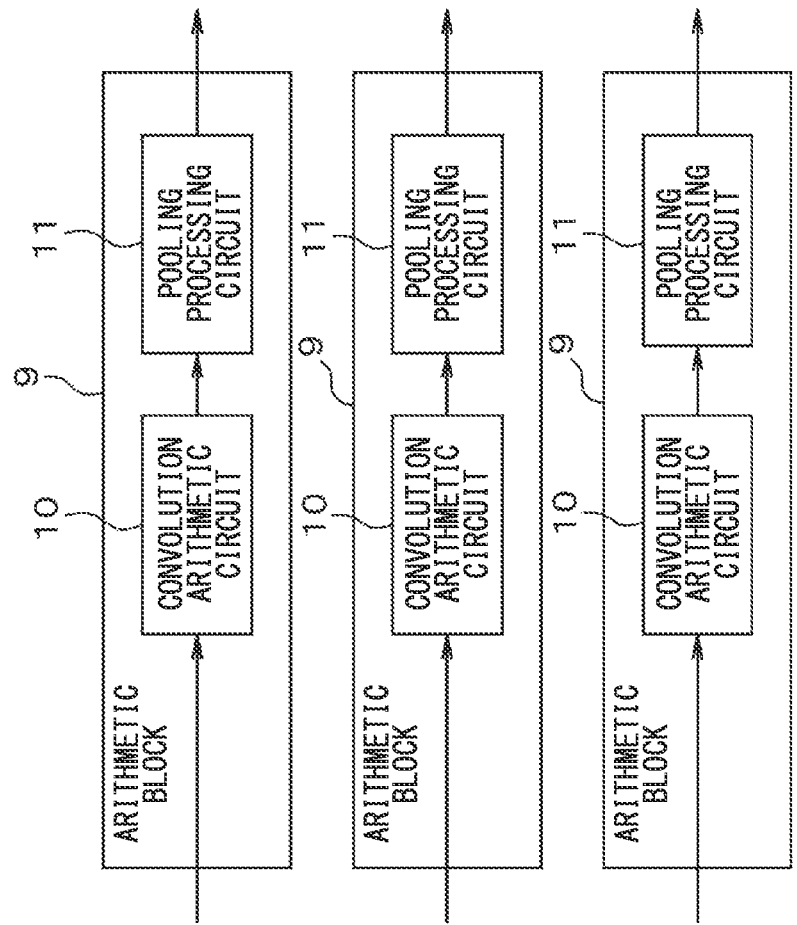
FIG. 4 is a block diagram that illustrates an arithmetic block.

The intermediate layer 7 includes an arithmetic block 9 having a semiconductor integrated circuit as illustrated in FIG. 4. The arithmetic block 9 may also be referred to as an electronic circuit. The arithmetic block 9 links a convolution arithmetic circuit 10 and a pooling processing circuit 11. Multiple convolution arithmetic circuits 10 and multiple pooling processing circuits 11 are respectively linked according to the depth of the intermediate layer 7.

The convolution arithmetic circuit 10 functions as a convolutional layer, and outputs to the pooling processing circuit 11 convolution arithmetic result required for one pooling process at each one arithmetic cycle.

The pooling processing circuit 11 functions as a pooling layer, and receives the convolution arithmetic result from the convolutional arithmetic circuit 10 to execute pooling computation. In this situation, for example, the data having the largest value among the convolutional arithmetic result data of the convolution arithmetic circuit 10 is output as a pooling arithmetic result.

The microcomputer 4 includes, for example, a CPU 12, a ROM 13 and a RAM 14. The ROM 13 may also be referred to as a storage.

The ROM 13 stores a test image data 16 and an expected value data 17. The test image data 16 is original data developed in the RAM 14. The expected value data 17 is original data of an expected value corresponding to the test image data 16. The expected value data 17 has information that indicates a normal recognition accuracy when the test image data 16 is subjected be processed by image processing in the image processor 3. The test image data 16 includes all of the characteristic patterns respectively recognized by the recognition algorithms. The test image data 16 and the expected value data 17 stored in the ROM 13 are transferred from the ROM 13 to the RAM 14 at the time of activating the image processing apparatus 2.

The RAM 14 provides a test image provider 18 and an expected value storage 19. The image provider 18 stores image data of the test image data 16 used for the fault diagnosis of the image processor 3. The expected value storage 19 stores the expected value data 17 corresponding to the test image data 16. In addition, the RAM 14 provides an image processing result device 20 and a test image processing result device 21. The image processing result device 20 stores the recognition accuracy of image processing of the image processor 3 on the image data from the camera 1. The test image processing result device 21 stores the recognition accuracy of the image processing of the image processor 3 on the test image data 16.

The CPU 12 includes a fault diagnostic device 12a and an output controller 12b for executing a program stored in a non-transitory tangible storage medium.

The fault diagnostic device 12a adopts the test image data 16 developed in the RAM 14 to cause the image processor 3 to execute the image processing. The fault diagnostic device 12a compares the recognition accuracy for the test image data 16 with the expected value data 17 corresponding to the test image data 16, and determines whether or not the image processor 3 has a fault. The fault diagnostic device 12a periodically executes a fault diagnosis using the test image data 16 in parallel with the image processing executed by the image processor 3 on the image data received from the camera 1.

The output controller 12b executes output control related to the recognition accuracy of the image data based on the diagnosis result produced by the fault diagnostic device 12a. In a case where the diagnosis result produced by the fault diagnostic device 12a is normally indicated, the output controller 12b outputs the processing result processed by image processing as a valid result. The valid result may also be referred to as an effective result. The processing result output from the output controller 12b as the valid result is output to a vehicle controller 15, and is used for vehicle control related to information presentation to a driver of the vehicle or travel safety. In a case were the diagnosis result produced by the fault diagnostic device 12a indicates a fault, fail-safe control is executed for the vehicle controller 15.

The following describes a series of processing executed by the image processing apparatus 2. The image processor 3 executes image processing for recognizing the characteristic pattern for the image data from the camera 1, and stores the recognition accuracy for the image data into the image processing result device 20 of the RAM 14.

The fault diagnostic device 12a uses the test image data 16 developed in the test image provider 18 of the RAM 14 before the image processing is terminated and the recognition accuracy is output, and causes the image processor 3 to execute the image processing for the test image data 16. The image processor 3 stores the recognition accuracy for the test image data 16 into the test image processing result device 21 of the RAM 14, The fault diagnostic device 12a in the CPU 12 compares the recognition accuracy for the test image data 16 stored in the test image processing result device 21 with the expected value data 17 corresponding to the test image data 16 previously developed in the expected value storage 19, and determines whether or not the image processing result is normal based on the consistency between the recognition accuracy and the expected value data 17. In a situation where the recognition accuracy for the test image data 16 and the expected value data 17 corresponding to the test image data 16 satisfy predetermined consistency criteria, the fault diagnostic device 12a determines that the image processing result is normal. In a situation where the recognition accuracy for the test image data 16 and the expected value data 17 corresponding to the test image data 16 does not satisfy predetermined consistency criteria, the fault diagnostic device 12a determines that the image processor 3 has a fault.

In parallel with the processing executed by the fault diagnostic device 12a, various arithmetic processing is executed based on the image processing result for the image data through the image processor 3. In this situation, since the processing of the fault diagnostic device 12a is prioritized, various arithmetic processing is executed after the termination of processing executed by the fault diagnostic device 12a.

In a situation where the determination result of the fault diagnostic device 12a is determined to be normal, the output controller 12b outputs the processing result related to the present image as the valid processing result. The notification information indicating that the function related to the image processing through the image processor 3 is notified to the driver through the vehicle controller 15.

In a situation where the determination result produced by the fault diagnostic device 12a is determined to have a fault, the output controller 12b executes the fail-safe control for the vehicle controller 15 in a case where the event of detecting the fault has not continuously occurred for the defined number of occurrences. The output controller 12b does not output the processing result related to the present image and discards it. The output controller 12b notifies of the information indicating that the function related to the image processing executed by the image processor 3 cannot be used to the driver through the vehicle controller 15, The output controller 12b executes a repair operation related to the image processor 3, in a situation where the event of detecting the fault has continuously occurred for the defined number of occurrences. The output controller 12b resets the test image data 16 by retransferring the test image data 16 from the ROM 13 to the test image provider 18 of the RAM 14.

In a situation where the electronic circuit in the arithmetic block 9, for example, a transistor has a fault, the image recognition result of the neural network 5 changes from the initial image recognition result. Therefore, the recognition of the characteristic pattern cannot be correctly executed based on the image data from the camera 1.

In a situation of diagnosing such a fault in the arithmetic block 9, the test image data 16 is provided to the recognition algorithm, and it is possible to determine whether or not the recognition result changes from the one at the normal time. When the recognition algorithms are respectively designed to recognize a round pattern, a quadrilateral pattern, and a triangular pattern as illustrated in, for example, FIGS. 2, 3, the respective recognition algorithms are designed to enhance the recognition accuracy for the round pattern, the quadrilateral pattern and the triangular pattern. In this situation, the recognition algorithms respectively optimized for recognizing the round pattern, the quadrilateral pattern and the triangular pattern are operated in the time-division manner.

The round pattern, the quadrilateral pattern and the triangular pattern are provided in a time-division manner to the neural network as the test image data 16.

In a situation where the recognition result in a case where the round pattern is provided to the neural network 5 is different from the round pattern, it is possible to determine that the electronic circuit for executing the recognition algorithm for the round pattern has a fault. Similarly, in a situation where the recognition result in a case where the quadrilateral pattern or the triangular pattern is provided to the neural network 5 is different from the round pattern, it is possible to determine that the electronic circuit for executing the recognition algorithm for recognizing the quadrilateral pattern or the triangular pattern has a fault.

Since the image processing of the test image data 16 by such time division is required to be executed every time the image data is received from the camera 1, the time for checking all of the recognition algorithms is required. Therefore, it is estimated that the image processing apparatus 2 will take time for the image processing of the test image data 16 and thus hinder the original image processing.

Under such circumstances, in the present embodiment, the image processing apparatus 2 determines whether the image recognition function in the neural network 5 is normal with one piece of the test image data 16 at the time of diagnosing the fault. The test image data 16 is set to include the characteristic patterns of all the recognition targets.

For example, when the detected target has the round pattern, the quadrilateral pattern and the triangular pattern, the recognition algorithms are respectively designed to enhance the recognition accuracies for the round pattern, the quadrilateral pattern and the triangular pattern. Herein, the double round pattern includes all characteristic patterns having the round pattern, the quadrilateral pattern and the triangular pattern. Therefore, in a situation of having image recognition of the double round pattern through each of the recognition algorithms, since the round pattern is the most similar to the double round pattern, the recognition accuracy for recognizing the round pattern through the recognition algorithm for recognizing the round pattern is the highest.

Although the characteristic pattern of the quadrilateral pattern is not similar to the double round pattern, the quadrilateral pattern has the characteristic pattern of a ring shape that is identical to the double round pattern. Thus, the recognition accuracy for recognizing the quadrilateral pattern through the recognition algorithm for the quadrilateral pattern is relatively high. Although the characteristic pattern of the triangular pattern is the most dissimilar to the double round pattern, both of the triangular pattern and the quadrilateral pattern have the same characteristic pattern of the ring shape. Thus, the recognition accuracy for recognizing the triangular pattern through the recognition algorithm for the triangular pattern is the lowest.

In a situation where the double round pattern is provided to each of the recognition algorithms as the test image data 16, since the recognition accuracies for a target recognized by all the recognition algorithms are different, it is possible to determine whether the arithmetic block 9 has a fault by detecting a change of the recognition result from the one at a normal state.

Since the detected target is, for example, a vehicle, a person or a road sign, the test image data 16 including these characteristic patterns is created. The test image data 16 depends on the recognition algorithm. When the recognition algorithm is modified, it is required to create the test image data 16 corresponding to the modified recognition algorithm.

Figure 5:
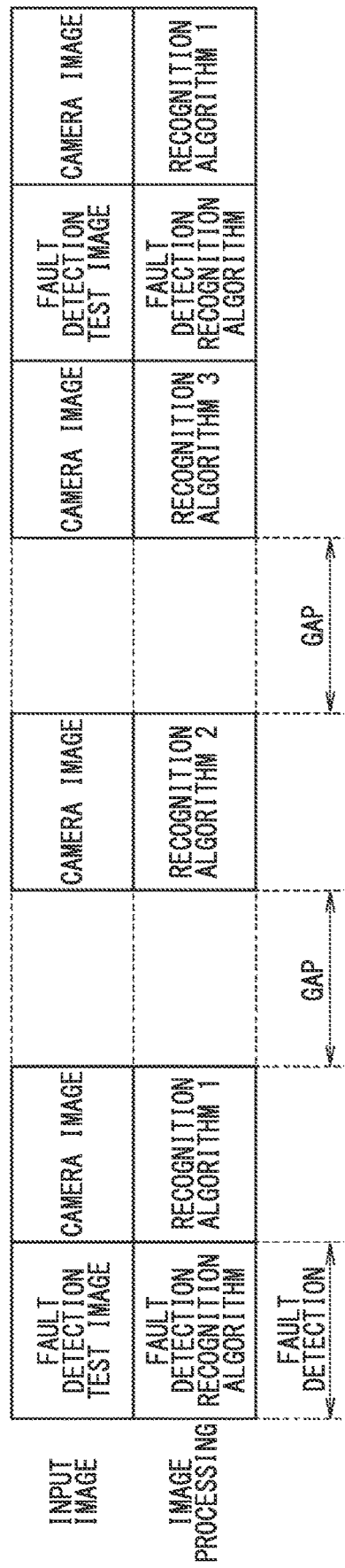
FIG. 5 is a timing diagram that illustrates an operation of processing image recognition.

As a recognition operation, a fault detection is executed by recognizing the test image data 16 through the recognition algorithm. In this situation, since it is possible to execute the diagnosis simultaneously by all of the recognition algorithms, there will be a free time period until the image data is recognized by the recognition algorithm as illustrated in FIG. 5. Therefore, it is possible to execute arithmetic processing by adopting the free time period. The free time period may also be referred to as a gap period.

According to the embodiment described above, the following advantageous effects can be achieved.

The image processing apparatus 2 determines that the image processor 3 has a fault, based on a condition that the recognition result through the multiple algorithms in a case of providing the test image data to the image processor 3 is different from the original recognition result which is preliminarily stored. Therefore, it is possible to diagnose multiple recognition algorithms simultaneously, and it is possible to enhance the usage efficiency of the image processor 3.

Since the image processor 3 includes the neural network 5, it is possible to simultaneously detect a fault in the electronic circuit having the neural network 5.

Figure 3:
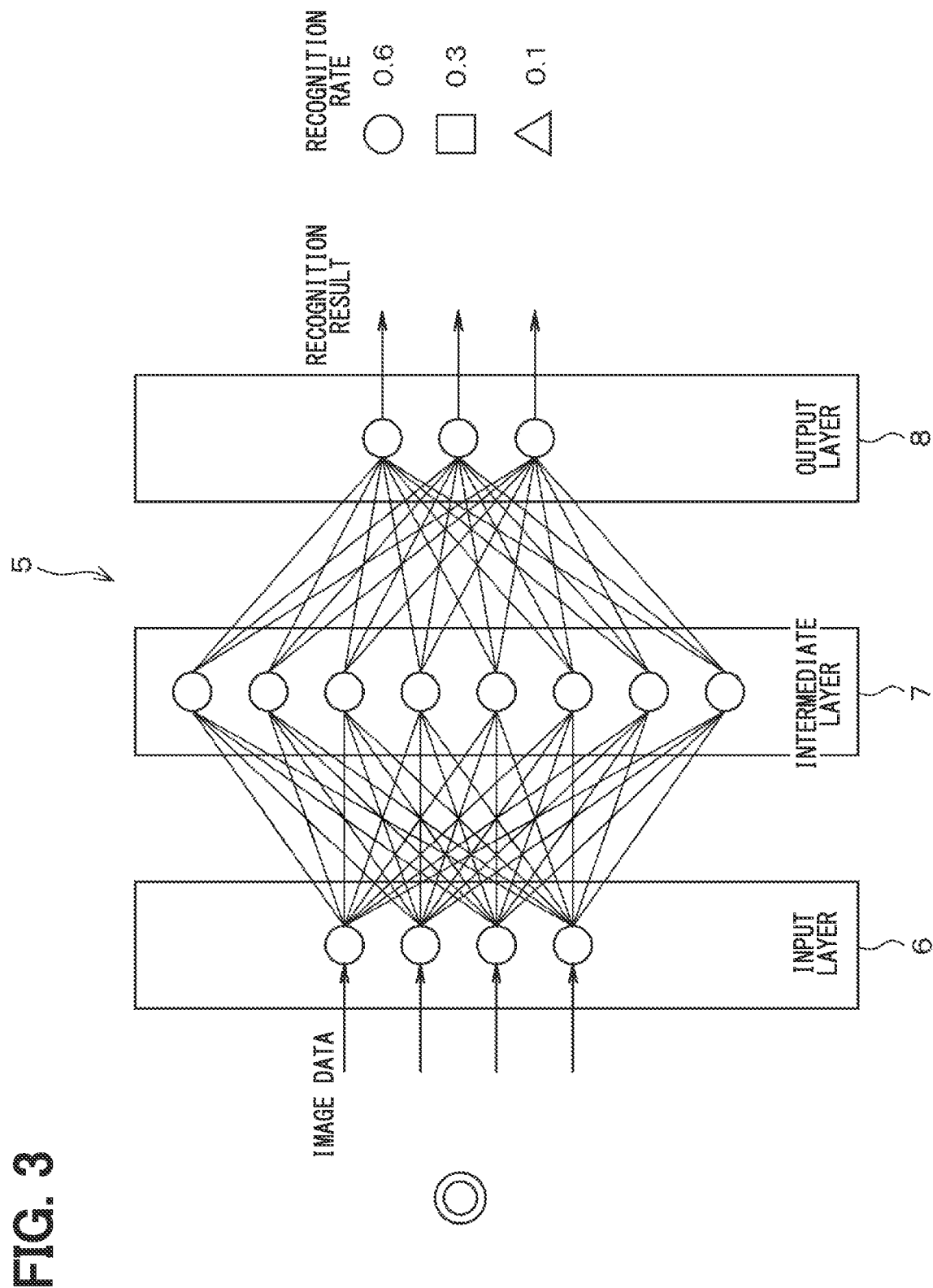
FIG. 3 illustrates an overall configuration of a neural network circuit.

The fault detection described in this disclosure may also be referred to as an anomaly detection. The recognition accuracy described in this disclosure may also be referred to as a recognition rate expressed, for example, in a range from 0 to 1 as illustrated in FIG. 3. The expected value data 17 may be also referred to as an expected value.

(Other Embodiments)

It may also be applied to a driver status monitor (DSM) for taking a photo of a driver with the camera 1 to monitor the driver's condition. When a pair of sunglasses or a mask is recognized by the recognition algorithm, the task image data 16 including the characteristic pattern of the pair of sunglasses or the mask is created.

A stereo camera may be adopted as the camera. In this situation, the distance to the recognition target is measured from the image data provided from the stereo camera. When the image processing is executed according to the measured distance, a test image is created in consideration of both viewing angles of the stereo camera.

In a situation where color image data is output from the camera, layers corresponding to colors may be provided as layers 6 to 8 included in the neural network 5.

Although the present disclosure has been described in accordance with embodiments, it is understood that the present disclosure is not limited to such embodiments or structures. The present disclosure encompasses various modifications and variations within the scope of equivalents. Furthermore, various combination and formation, and other combination and formation including one, more than one or less than one element may be made in the present disclosure.

What is claimed is:

1. An image processing apparatus comprising:
   a photographing device configured to output image data;
   an image processor including a neural network provided with a plurality of arithmetic blocks, the plurality of arithmetic blocks configured to execute a plurality of recognition algorithms in parallel for image recognition to recognize whether a predetermined recognition target is included in the image data; and
   a fault diagnostic device configured to determine that a fault occurs in the image processor, based on a condition that a recognition accuracy as a first recognition result output from the neural network in case of providing a single piece of test image data to the image processor is different from an expected value as a second recognition result output from the neural network in case of preliminarily providing the single piece of the test image data to all of the plurality of recognition algorithms,
   wherein the single piece of the test image data includes characteristic patterns, all of which correspond to the predetermined recognition target and are recognized by the plurality of recognition algorithms,
   wherein each of the first recognition result and the second recognition result indicates a result of recognizing the characteristic patterns through the plurality of recognition algorithms, and
   wherein the fault occurring in the image processor indicates that the image processor did not accurately perform the image recognition to recognize whether the predetermined recognition target is included in the image data.

2. The image processing apparatus according to claim 1, further comprising:
   a storage configured to store the test image data and the expected value.

3. The image processing apparatus according to claim 1, wherein the neural network includes an intermediate layer having a combination of a convolutional layer and a pooling layer.

4. The image processing apparatus according to claim 1, wherein the predetermined recognition target includes an obstacle located around a vehicle.

5. The image processing apparatus according to claim 1, wherein the predetermined recognition target includes an occupant in a vehicle.

6. The image processing apparatus according to claim 1, wherein each of the plurality of arithmetic blocks is an electronic circuit.

7. The image processing apparatus according to claim 1, wherein the plurality of arithmetic blocks are configured to execute the plurality of recognition algorithms simultaneously for the single piece of the test image data in a case where the single piece of the test image data is provided to the image processor.

8. An image processing apparatus comprising:
   a camera configured to output image data;
   an image processor including a neural network provided with a plurality of arithmetic blocks, the plurality of arithmetic blocks configured to execute a plurality of recognition algorithms in parallel for image recognition to recognize whether a predetermined recognition target is included in the image data; and
   a processor and a memory that stores instructions configured to, when executed by the processor, cause the processor to determine that a fault occurs in the image processor, based on a condition that a recognition accuracy output as a first recognition result from the neural network in case of providing a single piece of test image data to the image processor is different from an expected value as a second recognition result output from the neural network in case of preliminarily providing the second piece of the test image data to all of the plurality of recognition algorithms,
   wherein the single piece of the test image data includes characteristic patterns, all of which correspond to the predetermined recognition target and are recognized by the plurality of recognition algorithms that are also included in the predetermined recognition target,
   wherein each of the first recognition result and the second recognition result indicates a result of recognizing the characteristic patterns through the plurality of recognition algorithms, and
   wherein the fault occurring in the image processor indicates that the image processor did not accurately perform the image recognition to recognize whether the predetermined recognition target is included in the image data.

9. The image processing apparatus according to claim 8, wherein each of the plurality of arithmetic blocks is an electronic circuit.

10. The image processing apparatus according to claim 8, wherein the plurality of arithmetic blocks are configured to execute the plurality of recognition algorithms simultaneously for the single piece of the test image data in a case where the single piece of the test image data is provided to the image processor.

* * * * *